United States Patent
Johnston et al.

(10) Patent No.: US 10,709,979 B2
(45) Date of Patent: Jul. 14, 2020

(54) SYSTEMS AND METHODS FOR ADJUSTING A STEREOSCOPIC EFFECT

(71) Applicant: NINTENDO CO., LTD., Kyoto (JP)

(72) Inventors: Rory A. Johnston, Redmond, WA (US); Jonathan J. Johnson, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 120 days.

(21) Appl. No.: 16/005,122

(22) Filed: Jun. 11, 2018

(65) Prior Publication Data
US 2019/0374855 A1 Dec. 12, 2019

(51) Int. Cl.
| | | |
|---|---|---|
| A63F 13/525 | (2014.01) | |
| A63F 13/25 | (2014.01) | |
| G06T 15/20 | (2011.01) | |
| H04N 13/254 | (2018.01) | |
| H04N 13/302 | (2018.01) | |
| H04N 13/117 | (2018.01) | |
| H04N 13/00 | (2018.01) | |

(52) U.S. Cl.
CPC ............ *A63F 13/525* (2014.09); *A63F 13/25* (2014.09); *G06T 15/205* (2013.01); *A63F 2300/8082* (2013.01); *G06T 2210/12* (2013.01); *G06T 2210/21* (2013.01)

(58) Field of Classification Search
CPC .... A63F 13/525; A63F 13/5258; A63F 13/25; A63F 2300/8082; G06T 2210/21; G06T 15/205; G06T 2210/12; H04N 13/254; H04N 13/302; H04N 13/117; H04N 13/00
See application file for complete search history.

(56) References Cited

U.S. PATENT DOCUMENTS

| | | | | |
|---|---|---|---|---|
| 2001/0021665 | A1* | 9/2001 | Gouji | A63F 9/305 463/7 |
| 2003/0107647 | A1* | 6/2003 | James | A63F 13/10 348/116 |
| 2006/0205502 | A1* | 9/2006 | Kaneshige | A63F 13/426 463/33 |
| 2006/0209068 | A1* | 9/2006 | Ajioka | A63F 13/10 345/427 |
| 2011/0244958 | A1* | 10/2011 | Nimura | A63F 13/5252 463/31 |
| 2014/0354687 | A1* | 12/2014 | Kiuchi | G06T 19/006 345/633 |
| 2017/0113138 | A1* | 4/2017 | Makino | A63F 13/5258 |
| 2018/0276874 | A1* | 9/2018 | Myhill | A63F 13/25 |

* cited by examiner

*Primary Examiner* — Robert T Clarke, Jr.
(74) *Attorney, Agent, or Firm* — Nixon & Vanderhye, P.C.

(57) ABSTRACT

The technology described herein presents systems and methods for adjusting the visual effect of the image, particularly with respect to the stereoscopic effect. In one example embodiment, the technology can determine if a "collision" is detected between the virtual camera position and then adjust a parameter of the virtual camera based on the point of intersection associated with the "collision."

18 Claims, 14 Drawing Sheets

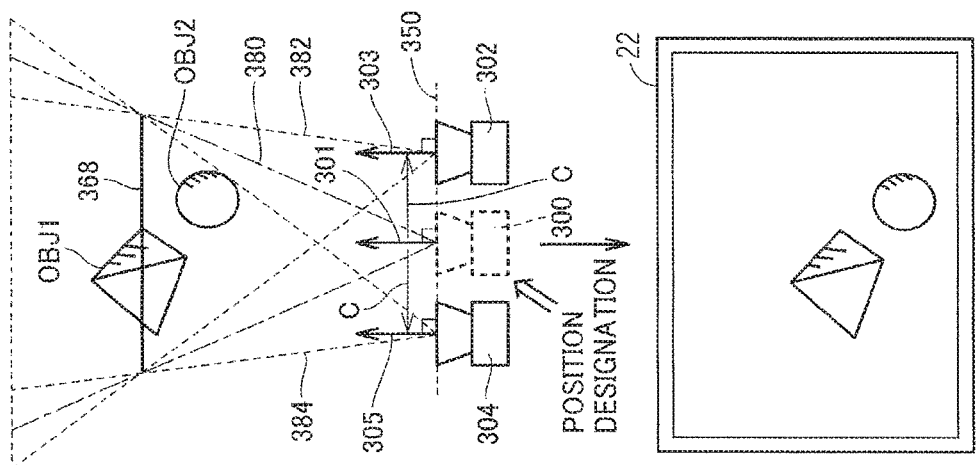
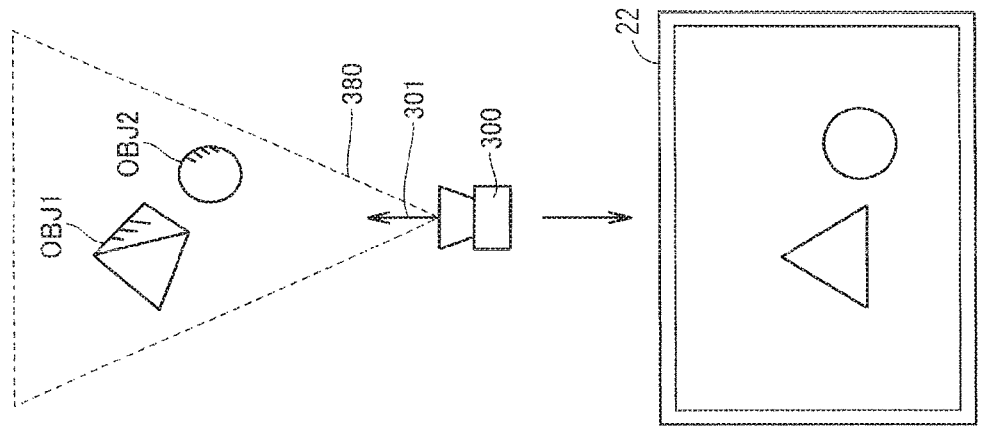

SYSTEMS AND METHODS FOR ADJUSTING A STEREOSCOPIC EFFECT

TECHNICAL OVERVIEW

Many modern day video games establish a virtual environment where objects exist in a virtual three-dimensional space and the virtual three-dimensional space is "imaged" by one or more virtual cameras. The image captured by the virtual camera(s) is then rendered on a display device where the user can interact with objects in the virtual three-dimensional environment. In some cases, the display devices are configured to generate a "real" three-dimensional image. One example of such a device is a stereoscopic display device that can generate an image by which the viewer can perceive the feeling of depth as if the displayed objects exist in the "real" world. While such devices can provide a user with a very "real 3-D" experience, certain drawbacks exist when rendering virtual images of a three-dimensional environment.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE DRAWINGS

FIGS. 3A & 3B show non-limiting example diagrams for generating images of a virtual space;

DETAILED DESCRIPTION OF EXAMPLE NON-LIMITING EMBODIMENTS OF THE TECHNOLOGY

Figure 1:
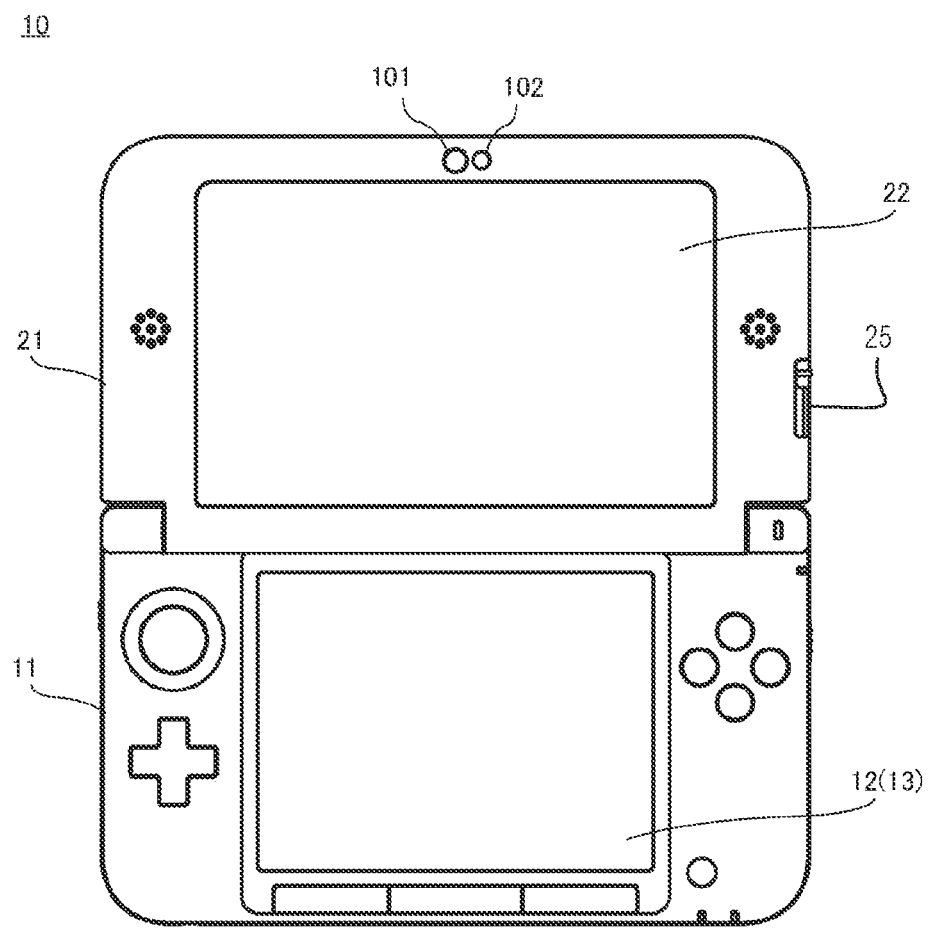
FIG. 1 shows an external view of an information processing apparatus.

Software programs are capable of generating a virtual three-dimensional space that can be displayed on a display device. For example, many video games generate a "game world" in a virtual three-dimensional environment where player characters, enemy objects, and other virtual objects and terrains exist. In generating the game world, one or more virtual cameras can "image" the game world so that the "captured" image is rendered for display.

In the example of stereoscopic display, the game world may be imaged using at least a left virtual camera and a right virtual camera. Certain objects in the game world may be at positions of observation of the left virtual camera and the right virtual camera that are different from each other. The magnitude of this difference for the particular object may be considered as the amount of parallax.

When rendering an image for stereoscopic display, the amount of parallax will result in the perceived sense of depth of the object as being recessed (into the display) or "popping-out" of the display. As such, certain objects will appear to pop-out of the display or be recessed into the display (depending on the amount of parallax) thus providing the image with a perception as though it is a real three-dimensional image. Likewise, certain objects may be at positions of observation of both the left and right virtual cameras such that there is little to no difference of position. In these instances, the objects will have little to no parallax and will appear as though they are on the display (i.e., not receding into or popping out of the display).

In certain environments, such as a video game environment, one or more virtual cameras may follow particular objects in the virtual three-dimensional space. Moreover, the virtual camera(s) may "focus" on an object by rendering the object such that it has little to no parallax (i.e., perceived as being on the display rather than having any sense of depth). In some instances when the image is being generated, various objects or parts of the terrain may obstruct the view of the object. In situations where a stereoscopic image is being rendered, the image may not only show various obstructions, but may also be unnatural or uncomfortable to view.

In one example, a game may allow for free movement of the camera system. For example, in a third-person game (e.g., action puzzle game) the user may control a player character using some type of input device. In this example, the camera can rotate substantially freely around a target position based on the player input and the target position can vary depending on the zoom level (e.g., the farthest zoom could target the center of the entire terrain/stage where a nearest zoom could center on a position of a virtual object).

Because of the free movement of the camera system, it is possible to zoom in close to a player character while looking down across the entire distance of the terrain (or even look at a wall blocking the camera(s) view of the player character). In such cases, the objects in front of the player character may appear to "pop" out of the screen and, in extreme cases, may appear in a manner that is very disorienting and unnatural. Moreover, objects at the edge of the display may only be partially drawn (i.e., clipped) and thus when rendered as a stereoscopic image, may appear very unnatural as they pop-out of the display. In general, the range in which a viewer can view an image with stereoscopic effect may be very limited and thus a feeling of too much recessed effect or pop-out effect is not desirable. Furthermore, the preferred range of an object having a pop-out effect is narrower than the preferred range of the object having a recessed effect.

The technology described herein presents systems and methods for adjusting the visual effect of the image, particularly with respect to the stereoscopic effect. In one example embodiment, the technology can determine if a "collision" is detected between the virtual camera position and a position of an object in the virtual world, and then adjust a reference virtual plane of the virtual camera based on the point of intersection associated with the "collision." In doing so, the technology advantageously renders a virtual three-dimensional image in a manner that is comfortably viewed by the user without expending a significant amount of processing resources to adjust the visual effect (e.g., stereoscopic effect). It should be appreciated that the examples described throughout this specification are directed to adjusting a stereoscopic effect of a displayed image. However, the technology is not limited to stereoscopic display and the technology envisions the techniques described herein to be employed in any variety of display devices including both two-dimensional and three-dimensional displays.

Moreover, the technology described in the specification refers to, in certain examples, adjusting a "focus" of the virtual camera(s). It should be appreciated that, in one non-limiting example, adjusting the "focus" of one or more virtual cameras may refer to adjusting a reference virtual plane (sometimes referred to as a "zero plane") of the virtual camera(s) so that objects at positions near the reference virtual plane will have little to no parallax (and thus appear on-screen as being on the display). Additionally, certain examples described in this specification refer to the virtual camera targeting a player character object. However, it should be appreciated that the virtual camera may target any particular object and the technology described herein is not limited in any way to targeting the player character object.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Example System for Adjusting Visual Effect

FIG. 1 shows an external view of a hand-held game apparatus 10 according to the present embodiment. As shown in FIG. 1, the hand-held game apparatus 10 includes a lower housing 11 and an upper housing 21. The lower housing 11 and the upper housing 21 are connected to each other so as to be openable and closable in a folding manner (foldable). Usually, a user uses the hand-held game apparatus 10 in an opened state. When not using the hand-held game apparatus 10, the user keeps the hand-held game apparatus 10 in a closed state. The lower housing 11 is provided with a lower LCD (liquid crystal display: liquid crystal display device) 12, and a touch panel 13. In addition, the lower housing 11 is also provided with operation buttons, an analog stick, and the like. On the other hand, the upper housing 21 is provided with an upper LCD (liquid crystal display: liquid crystal display device) 22.

It should be appreciated that the upper LCD 22 and/or the lower LCD 12 can be configured to display both two-dimensional images and/or three-dimensional images (e.g., real 3-D images). For example, the upper LCD 22 can be a display device capable of displaying a stereoscopically visible image. The upper LCD 22 is capable of displaying a left-eye image and a right-eye image, using substantially the same display area. Specifically, the upper LCD 22 can be a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a period of time. Further, the upper LCD 22 can be a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively.

In one embodiment, the upper LCD 22 can be a parallax-barrier-type display device. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 can be a display device capable of switching between: the stereoscopic display mode for displaying a stereoscopically visible image; and the planar display mode for displaying an image in a planar manner (displaying a planar view image). The switching of the display modes is performed by a 3D adjustment switch 25.

The 3D adjustment switch 25 can be a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. In one example embodiment, the 3D adjustment switch 25 is provided at an end portion shared by the inner surface and the right side surface of the upper housing 21, so as to be visible to the user, regardless of the open/closed state of the game apparatus 10. The 3D adjustment switch 25 can include a slider that is slideable to any position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be appreciated that the same image can be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The hand-held game apparatus 10 also includes a camera 101. The camera 101 is provided (above the upper LCD 22 in FIG. 1) on a surface of the upper housing 21. Thus, the camera 101 can take an image of the face of the user present in front of the hand-held game apparatus 10. As one example, the camera 101 can take an image of the user in a state of playing a game while viewing the upper LCD 22 or the lower LCD 12.

Further, the hand-held game apparatus 10 includes an infrared light emitter 102 which emits infrared light. The infrared light emitter 102 is provided at a position adjacent to the camera 101 on the surface of the upper housing 21. In other words, the infrared light emitter 102 is provided at a position where it can emit infrared light toward a position where the face of the user would be present while the user is using the hand-held game apparatus 10 (such as while playing a game). Here, the camera 101 can also take an infrared light image, in addition to a visible light image. Infrared light emitted from the infrared light emitter 102 irradiates the face of the user, and reflected light thereof enters the camera 101. Based on the reflected light, the camera 101 can take an infrared light image.

Figure 2:
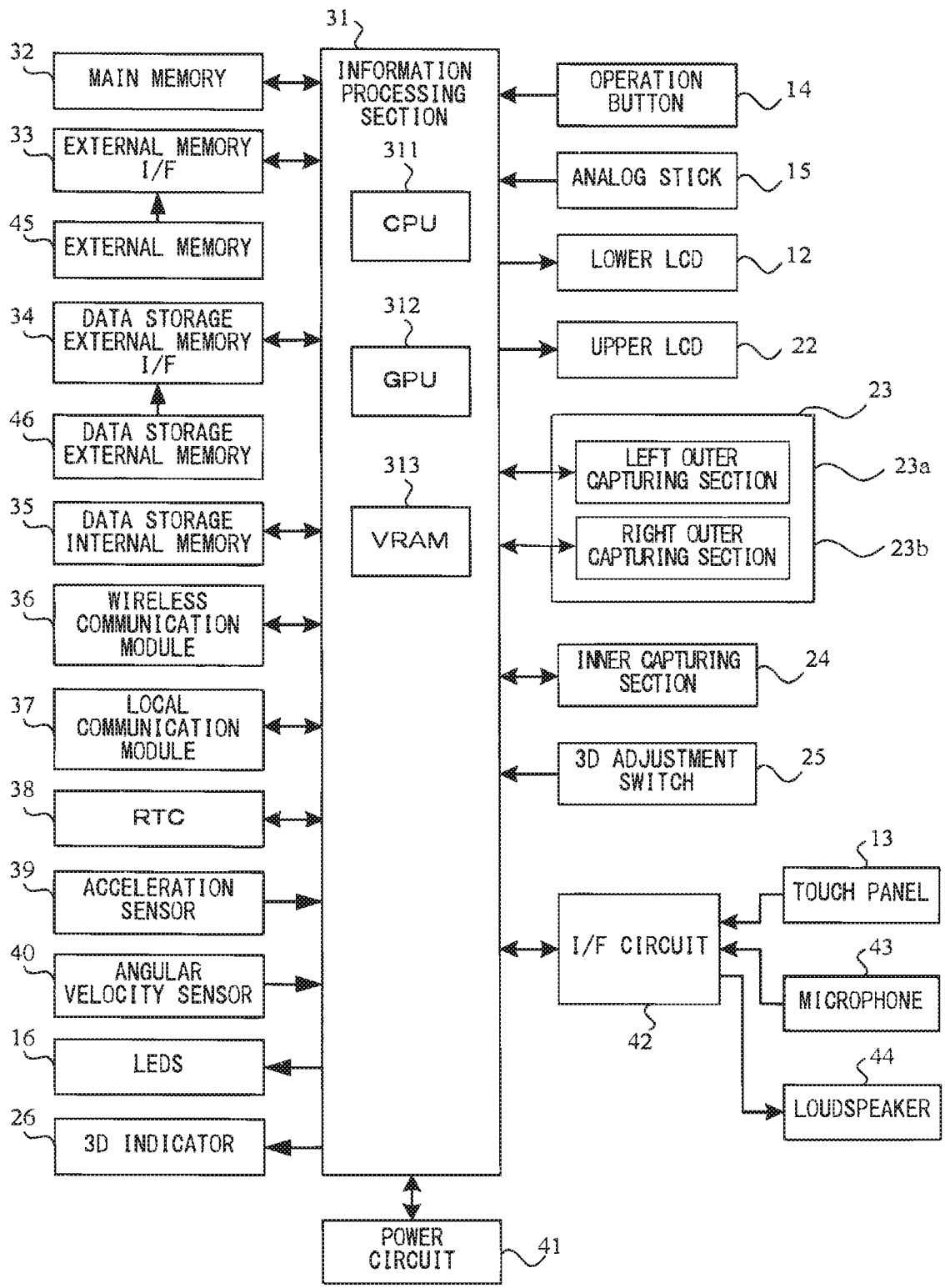
FIG. 2 shows a block diagram showing an example of the internal configuration of the information processing apparatus.

FIG. 2 is a block diagram showing an example of the internal configuration of the game apparatus 10. The game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11, or may be accommodated in the upper housing 21.

The information processing section 31 is information processing including a central processing unit (CPU) 311 that executes a predetermined program, a graphics processing unit (GPU) 312 that performs image processing, and the like. In one example embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs the image processing described later or game processing.

It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are operatively coupled. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 45, another device, or the like) the game apparatus 10. In one example embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed.

The data storage external memory 46 is composed of a readable/writable non-volatile memory (e.g., a NAND flash memory), and is used to store predetermined data. For example, the data storage external memory 46 stores images captured by the outer capturing section 23 and/or images captured by another device. When the data storage external memory 46 is connected to the data storage external memory I/F 34, the information processing section 31 loads an image stored in the data storage external memory 46, and the image can be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 can detect the magnitudes of accelerations (linear accelerations) in the directions of straight lines along three axial (x, y, and z axes in the present embodiment) directions, respectively. The acceleration sensor 39 is provided, for example, within the lower housing 11. The acceleration sensor 39 can detect the magnitudes of the linear accelerations produced in the respective axial directions.

It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40 is connected to the information processing section 31. The angular velocity sensor 40 detects angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) based on the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects a sound from the user, and outputs a sound signal to the I/F circuit 42. The amplifier amplifies the sound signal from the I/F circuit 42, and outputs the sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal to sound data in a predetermined format.

The touch panel control circuit generates touch position data in a predetermined format, based on a signal from the touch panel 13, and outputs the touch position data to the information processing section 31. The touch position data indicates the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In one example embodiment, the information processing section 31 causes the lower LCD 12 to display an image for a hand-drawn image input operation, and causes the upper LCD 22 to display an image acquired from either one of the outer capturing section 23 and the inner capturing section 24. That is, for example, the information processing section 31 causes the upper LCD 22 to display a stereoscopic image (stereoscopically visible image) using a right-eye image and a left-eye image that are captured by the inner capturing section 24, or causes the upper LCD 22 to display a planar image using one of a right-eye image and a left-eye image that are captured by the outer capturing section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer capturing section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 are connected to the information processing section 31. The outer capturing section 23 and the inner capturing section 24 each capture an image in accordance with an instruction from the information processing section 31, and output data of the captured image to the information processing section 31. In the first embodiment, the information processing section 31 gives either one of the outer capturing section 23 and the inner capturing section 24 an instruction to capture an image, and the capturing section that has received the instruction captures an image, and transmits data of the captured image to the information processing section 31. Specifically, the user selects the capturing section to be used, through an operation using the touch panel 13 and the operation button 14. The information processing section 31 (the CPU 311) detects that a capturing section has been selected, and the information processing section 31 gives the selected one of the outer capturing section 23 and the inner capturing section 24 an instruction to capture an image.

When started by an instruction from the information processing section 31 (CPU 311), the outer capturing section 23 and the inner capturing section 24 perform capturing at, for example, a speed of 60 images per second. The captured images captured by the outer capturing section 23 and the inner capturing section 24 are sequentially transmitted to the information processing section 31, and displayed on the upper LCD 22 or the lower LCD 12 by the information processing section 31 (GPU 312). When output to the information processing section 31, the captured images are stored in the VRAM 313, are output to the upper LCD 22 or the lower LCD 12, and are deleted at predetermined times. Thus, images are captured at, for example, a speed of 60 images per second, and the captured images are displayed, whereby the game apparatus 10 can display views in the imaging ranges of the outer capturing section 23 and the inner capturing section 24, on the upper LCD 22 of the lower LCD 12 in real time.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

FIG. 3A shows a non-limiting example case where an image expressing a three-dimensional virtual space including objects OBJ1 and OBJ2 is displayed on a display 22 (e.g., upper LCD 22). In this example, a virtual camera 300 can be set at any position within the three-dimensional virtual space where objects OBJ1 and OBJ2 are also arranged in the virtual space. Then, an image (planar two-dimensional image) is generated by virtually photographing objects OBJ1 and OBJ2 within the three-dimensional virtual space with virtual camera 300. A two-dimensional display can be provided on display 22 based on display data that includes the image generated by the reference virtual camera 300. Here, virtual camera 300 virtually photographs the three-dimensional virtual space and the object(s) within the three-dimensional virtual space for providing two-dimensional display (e.g., without providing stereoscopic display).

FIG. 3B shows a non-limiting example of processing for stereoscopically displaying a range similar to a range rendered in the two-dimensional display described above. In this example, in a three-dimensional virtual space including objects OBJ1 and OBJ2, virtual camera 300 is designated as in the two-dimensional display shown in at least FIG. 3A (it is noted that the "virtual camera set as in two-dimensional display" is referred to as a reference virtual camera). With an arrangement position of this reference virtual camera 300 serving as the reference, respective positions and directions of a right virtual camera 302 for generating a right image and a left virtual camera 304 for generating a left image are set. More specifically, with a camera position of reference virtual camera 300 serving as the reference, right virtual camera 302 is set such that it is distant by a distance C in a right direction from reference virtual camera 300, and left virtual camera 304 is set such that it is distant by distance C in a left direction from reference virtual camera 300. It is noted that respective camera directions and angles of view of the right virtual camera and the left virtual camera are set to values the same as those of the camera direction and the angle of view of reference virtual camera 300. Specifically, respective fields of view (view volumes) of right virtual camera 302 and left virtual camera 304 are also set. By thus virtually photographing objects OBJ1 and OBJ2 within the three-dimensional virtual space with the arranged right virtual camera 302 and left virtual camera 304, the right image and the left image are generated, respectively. Then, display data for a right eye is generated based on the right image and display data for a left eye is generated based on the left image. Stereoscopic display on display 22 can then be provided based on such display data.

In summary, in the stereoscopic display processing according to one example embodiment, in order to generate a right image and a left image used for stereoscopically displaying an image expressing the virtual space on display 22 (with reference virtual camera 300 serving as the reference), right virtual camera 302 and left virtual camera 304 used for virtual photographing of the virtual space (and the object(s) included therein) are set within the virtual space. Here, right virtual camera 302 and left virtual camera 304 are set within the virtual space such that a camera direction 303 of right virtual camera 302 and a camera direction 305 of left virtual camera 304 are the same (that is, camera direction 303 and camera direction 305 are in parallel to each other) and camera direction 303 (and camera direction 305) is perpendicular to a straight line (a reference line 350) passing through respective positions of right virtual camera 302 and left virtual camera 304.

When right virtual camera 302 and left virtual camera 304 are thus set, field of views (view volumes) of right virtual camera 302 and left virtual camera 304 are set respectively. In this example, a display target region, which is a range to desirably be displayed around the display surface of display 22 (typically, a reference virtual plane region 368 which is a two-dimensional plane set within the virtual space or a range where a specific object is present), is designated. Namely, the display target region corresponds at least to a region in the virtual space to be displayed on the display. This display target region is perpendicular to camera directions 303 and 305 and set on the side of camera directions 303 and 305. For right virtual camera 302 and left virtual camera 304, a view volume 382 of right virtual camera 302 and a view volume 384 of left virtual camera 304 are set respectively such that both of them include the display target region.

Namely, the plane of the display target region is perpendicular to camera directions 303 and 305. In addition, when viewed from right virtual camera 302 or left virtual camera 304, the display target region is present on the side of camera directions 303 and 305. Further, a direction extending from a point intermediate between right virtual camera 302 and left virtual camera 304 to the center of the display target region matches with camera directions 303 and 305. Furthermore, with regard to at least one virtual camera, the view volume of one virtual camera is set so as to extend toward the side where the other virtual camera is present, asymmetrically with respect to a line extending from the position of the other virtual camera in a corresponding camera direction (camera direction 303 or 305).

It should be appreciated that the view volume of the virtual camera(s) may refer to a range for rendering an image of the virtual space (and the objects included in the virtual space). That is, the virtual camera(s) may only render objects within the range defined by the view volume such that, any objects outside of this range will not be rendered. The view volume may include a near clipping plane that is set on a side in the vicinity of the virtual camera(s). The view volume may also include a far clipping plane that is set on a side farther from the virtual camera(s). The near clipping plane and far clipping plane may be set perpendicular to a line of the camera(s) direction and one or more objects positioned between the near clipping plane and far clipping plane, and included within a viewing angle of the virtual camera(s), may be rendered.

Here, the phrase that the view volume of one virtual camera "extends toward" the side where the other virtual camera is present, asymmetrically with respect to the camera direction of the virtual camera, means that, assuming a straight line extending from the position of one virtual camera in the camera direction as a camera axis, a center (e.g., a center of gravity) of any plane perpendicular to the camera axis of the virtual camera included in the view volume is present closer to the side where the other virtual camera is present, relative to the camera axis. In other words, the phrase refers to a state that the center of gravity of the entire view volume of one virtual camera is present closer to the side where the other virtual camera is present, with respect to the camera axis of one virtual camera. More preferably, the view volume of right virtual camera 302 extending asymmetrically and the view volume of left virtual camera 304 extending asymmetrically extend in a manner symmetric with respect to each other. Thus, a right image and a left image corresponding to a human's field of view can be generated, and therefore more natural stereoscopic display can be provided.

When generating stereoscopic display, a reference virtual plane may also reside within the view volume. The reference virtual plane is set within the three-dimensional virtual space and can correspond to a position of the display surface of a display device (e.g., a plane of which presence the user viewing the stereoscopic display feels at a position of the display surface in the three-dimensional virtual space). That is, objects in the virtual three-dimensional space at positions at or near the reference virtual plane will be rendered as appearing on the display (i.e., rather than having a recessed or popping-out effect). This reference virtual plane can also be set perpendicular to the camera direction. In addition, since an actual size of the display surface is finite, a reference virtual plane region corresponding to a range rendered on the display surface of display in the reference virtual plane can be defined. Namely, a rendered range in the reference virtual plane which is an infinite plane (a range included in the view volume) is a reference virtual plane region.

The "reference virtual plane region" defines a position and a region within the three-dimensional virtual space of which presence the user feels around the display surface in providing stereoscopic display (which can be exactly a position of the display surface, however, the position may be set, for example, as a position having prescribed offset from the display surface). Namely, though stereoscopic display includes a portion that appears as though it is popping up toward the front from the display surface, or a portion that appears as though it is recessed inside the back of the display surface. When right virtual camera 302 and left virtual camera 304 are set at respective positions as shown in FIG. 3B, how an object located in the space corresponding to the portion around the reference virtual plane region is displayed is the same between a right image and a left image generated by the respective virtual cameras (i.e., there is substantially no parallax). Therefore, for a user who views the display surface, an object located in the portion corresponding to the reference virtual plane region appears as though it is present at substantially the same position between the image visually recognized by the right eye (the right image) and the image visually recognized by the left eye (the left image), and consequently the portion appears to be positioned on the display surface itself (i.e., which is a surface actually displaying these images). On the other hand, regarding an object located in a portion corresponding to a plane set at a position different from the reference virtual plane region, the right object image and the left object image are different in display position depending on positional relation between right virtual camera 302 and left virtual camera 304 (i.e., display having some parallax), and for a user, the portion appears present at a position popping up from the display surface of or at a position recessed from the display surface.

It should be appreciated that the techniques described herein relate to adjusting the reference virtual plane (and corresponding reference virtual plane region) in order to adjust the stereoscopic effect. As discussed in more detail below, the virtual camera(s) may adjust the "focus" by changing the position of the reference virtual plane based on an intersection between a viewing position of the virtual camera(s) and a target object in the virtual world. Various techniques describing the processing associating with stereoscopic images are discussed in further detail in commonly assigned U.S. patent application Ser. No. 12/938,089 (incorporated herein by reference).

Figure 4:
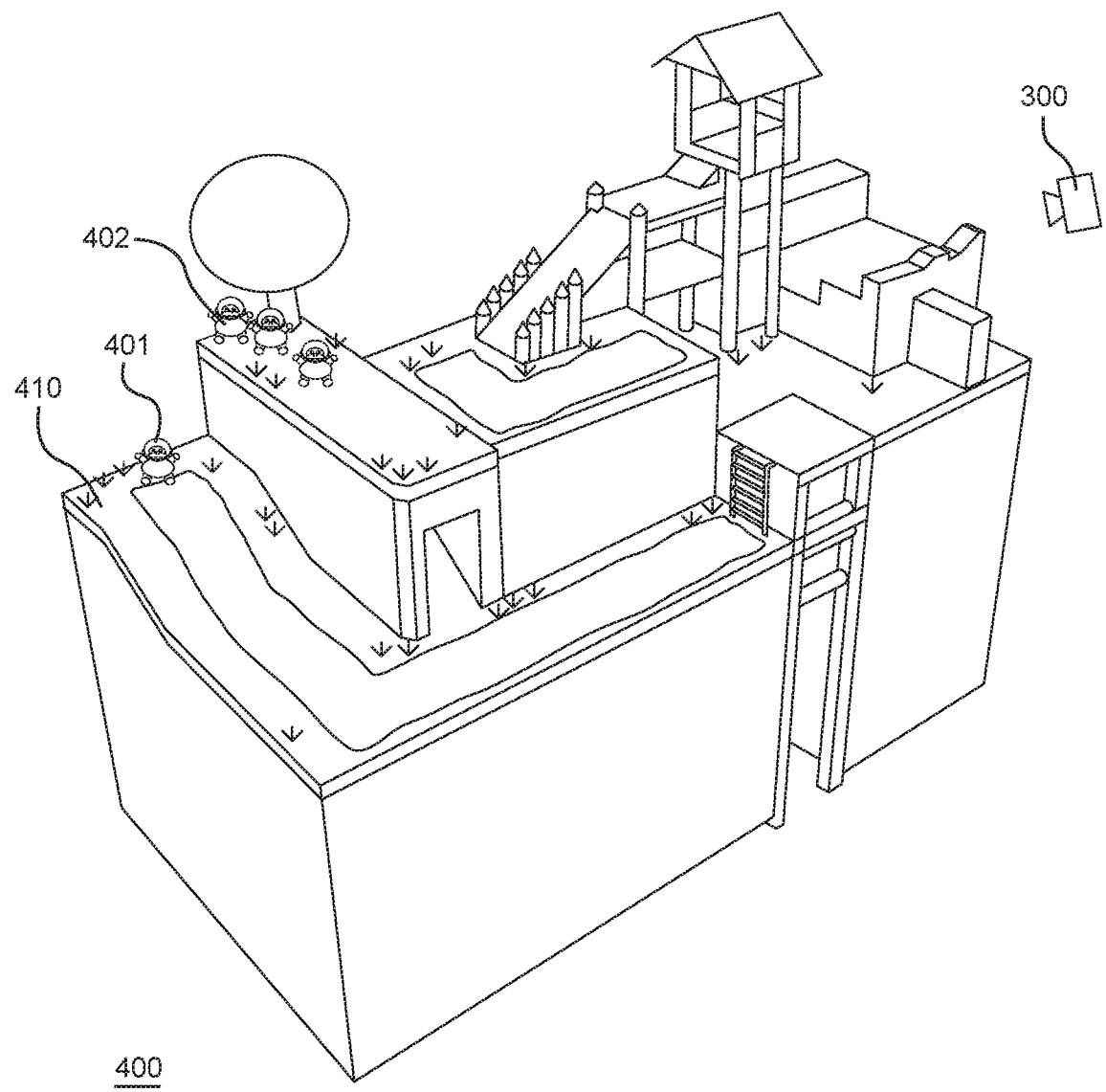
FIG. 4 shows a non-limiting example virtual environment of a video game world.

FIG. 4 shows a non-limiting example virtual environment 400 of a video game world. The virtual space 400 is displayed as a virtual three-dimensional game space where objects can be placed and moved in at least three directions. The virtual environment includes, at least, a terrain 410, a player character 401, and one or more enemy objects 402. This example is of course non-limiting and the virtual space 400 is configured to show any variety of terrain and/or objects.

As can be seen in FIG. 4, the terrain 410 comprises a three-dimensional landscape that includes various objects such as grass, trees, flowers, ladders, and/or various structures. The terrain also is navigable in at least three directions as the user can navigate the player character 401 along both an x-axis and y-axis, as well as a z-axis. In the example shown in FIG. 4, the player character 401 can move up and down the terrain, in some cases, by climbing objects (e.g., using a ladder) or walking up a set of stairs. In one example embodiment, an objective of the game may include navigating the terrain 410 to find various treasures and objects where obtaining the treasures and objects can award the user with points. In navigating the terrain 410, the player character 401 will attempt to avoid enemy characters 402 (or find ways to dispense with them). It should be appreciated that enemy characters 402 may instead be friend characters 402 (that are allies with player character 401) and the game can includes a combination of enemy characters and friend characters within the virtual space 400.

The virtual space 400 can be imaged from the virtual camera 300. As mentioned previously, the virtual camera 300 is capable of generating an image that is displayed as a two-dimensional image or a three-dimensional image (e.g., a stereoscopic image). In the example shown in FIG. 4, based on the camera 300 placement, the image that would be generated of the virtual space 400 would be one that views the entirety of the virtual space looking down on the terrain 410 towards the player character 401 (e.g., viewing the game terrain 410 in a "long" shot). In one example embodiment, camera 300 may follow the player character 401 as the player character 401 moves along the terrain 410.

In the example of FIG. 4, the player character 401 may be moved by the user controlling an analog stick of the game device. For example, if the user moves the analog stick in a leftward direction, the player character 401 may move left on the display screen. This example is of course non-limiting and the technology envisions any variety of methods for moving the player character 401 including moving the character 401 to correspond to the movement and/or attitude of the game device (e.g., using the accelerometers and/or gyroscopes). The user may also manipulate the position and/or orientation of the camera 300 using one or more inputs on the game device. For example, the user may rotate the camera 45 degrees to the left or right by pressing "L" or "R" trigger buttons attached to the game device. The user can move the camera using a variety of methods where the camera can rotate and move substantially freely around a target position in the game space.

The user may also zoom in or out using the camera 300. In one example, the target position may vary based on the zoom level where a farthest zoom targets the center of the entire terrain 410 and a nearest zoom can be centered on a player character 401 position. It should be appreciated that the stages/levels are designed, in one non-limiting example embodiment, as small dioramas that are substantially rectangular in shape. The camera 300 may also be designed to never "clip" into the stage itself and thus the image will never show a partially "clipped" terrain 410 (e.g., because the camera 300 is viewing the game terrain in a "long" shot).

As mentioned above, the camera 300 may be used to generate a three-dimensional stereoscopic image. The three-dimensional effect, in certain example embodiments, may give too strong a sense of depth of the terrain 410 and may also attempt to keep the player character 401 at a position of the stereo field so that it is easier to focus on the player character 401 (i.e., the player character 401 may be displayed to appear on the display itself, with little to no stereoscopic effect). Due to the substantially free movement of the camera 300, it is possible view the player character 401 while viewing downward across the entire distance of the terrain 410 (or even view a wall blocking the camera 300 view of the player character 401). In these instances, the objects that are in front of the player character 401 (i.e., objects that are between the character 401 and the position of camera 300) may appear to "pop" out of the screen. In certain instances, such as a wall blocking the camera 300 view, the stereoscopic display may appear disorienting and unnatural.

FIGS. 5A-7C depict various methods for addressing the above-mentioned issues. More specifically, FIGS. 5A-7C depict methods for adjusting a visual effect of an image (e.g., a stereoscopic effect) based on the viewpoint of the virtual camera 300 with respect to a target object. It should be appreciated that the examples described with respect to FIGS. 5A-7C depict the target object as the player character 401. However, this example is non-limiting and the technology described herein envisions any variety of target objects in the virtual space or any position in the virtual space. That is, while the examples describe targeting the player character 401, the desired target could be another virtual object (e.g., an ally or enemy object) or could just be any position in the virtual space.

Figure 5A:
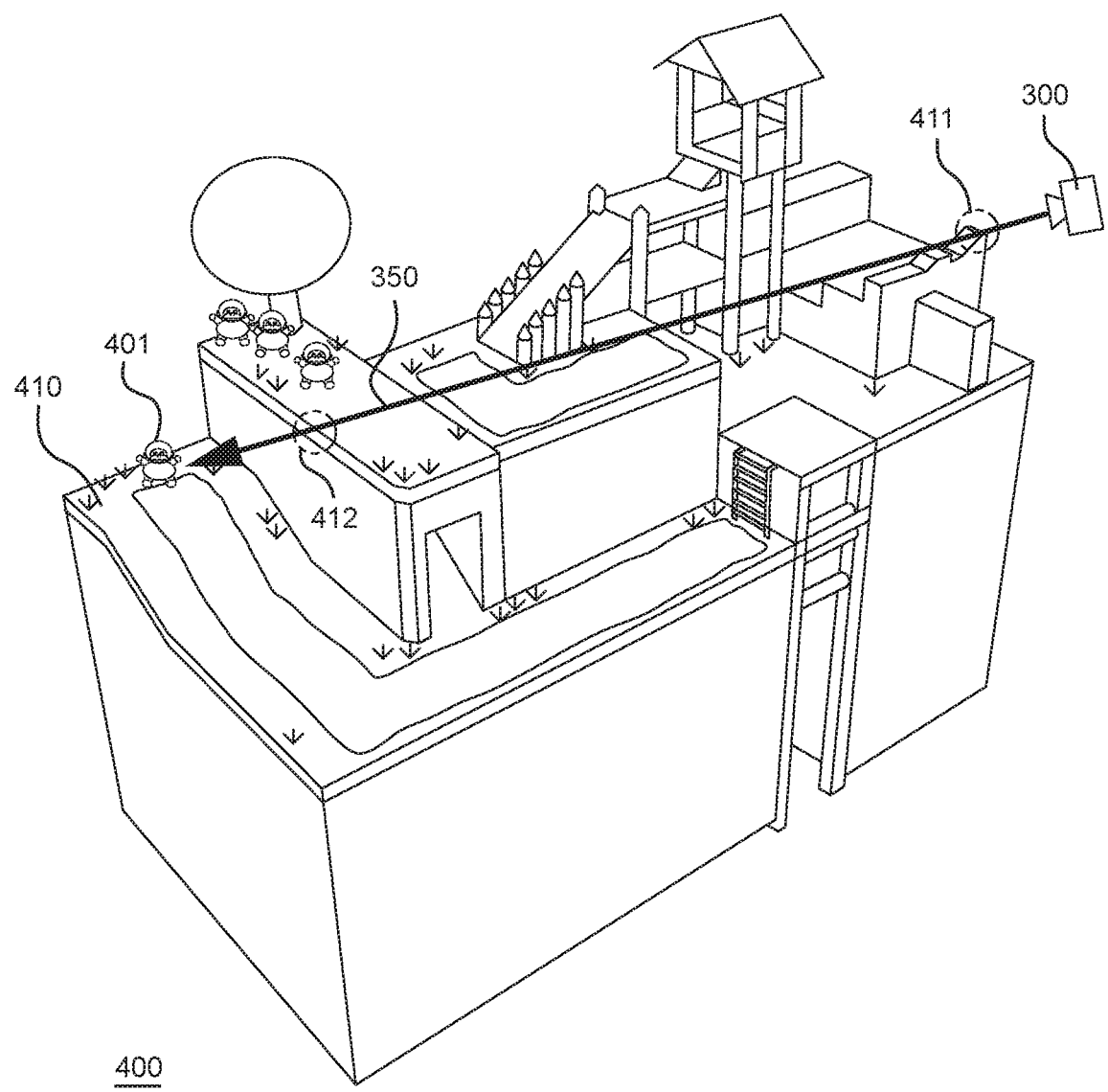
FIGS. 5A-5C show an example method for adjusting the visual effect of an image.
Figure 5B:
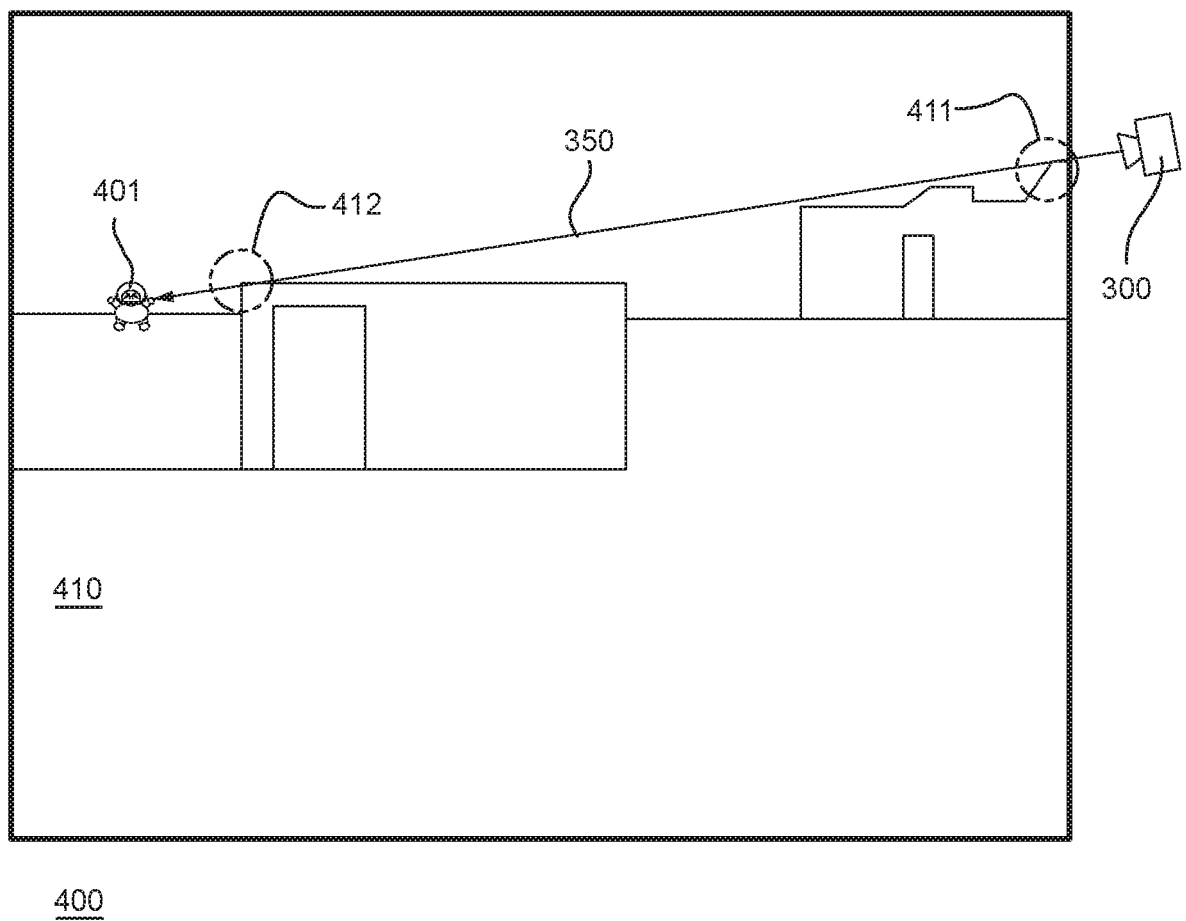
Figure 5C:
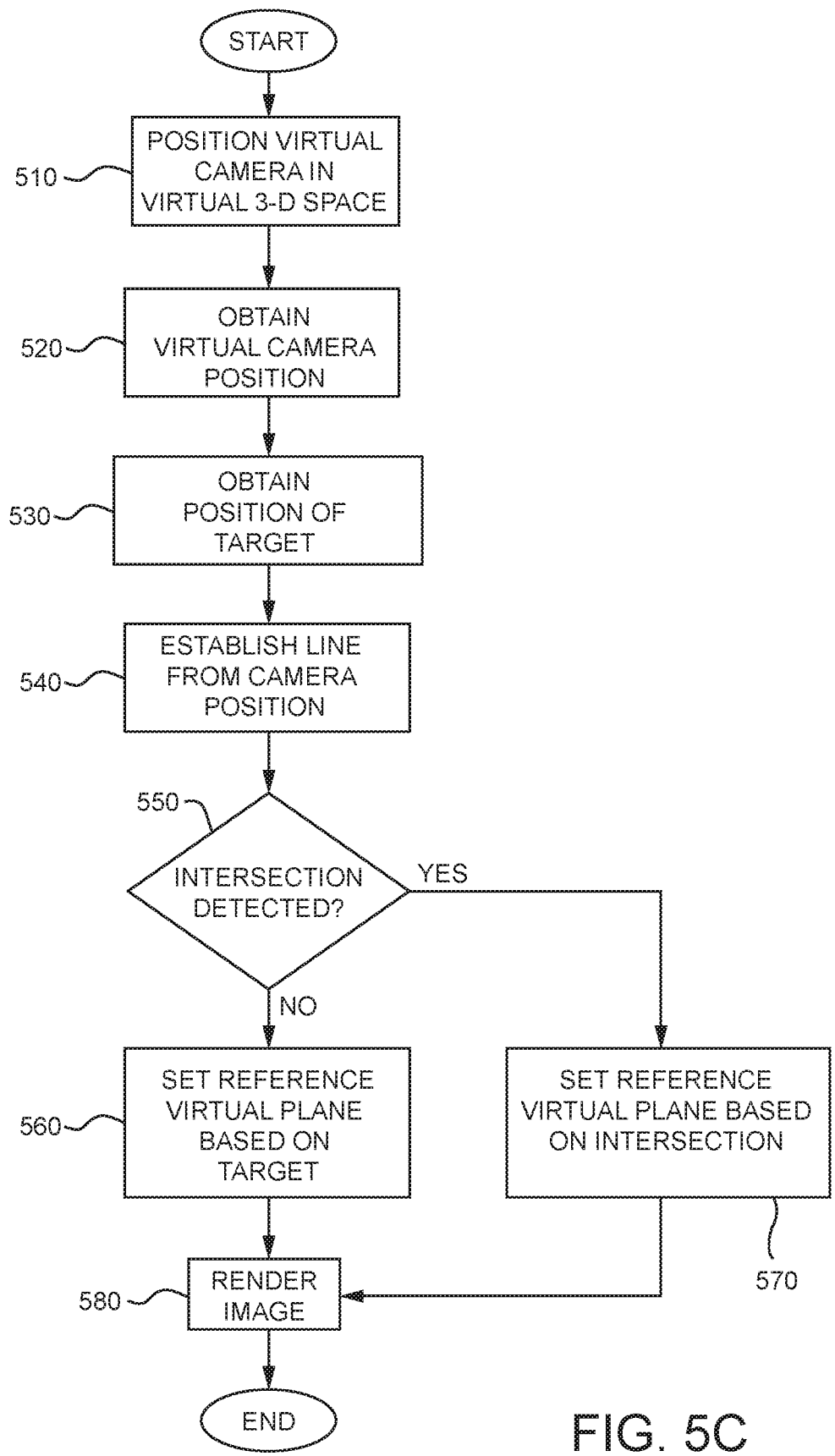

FIGS. 5A-5C show one example method for adjusting the visual effect of an image. In the example shown in FIG. 5A, the camera 300 is placed at one end of the virtual space 400 where the player character 401 is positioned on the terrain 410 at almost an opposite end of the virtual space 400. In this example, one or more pieces of the terrain 410 are in front of the player character 401 between the character 401 and camera 300. FIG. 5A thus depicts a scenario where a piece of the terrain 410 may appear to "pop" out or provide an image that is uncomfortable to view by a viewer. Moreover, a reference virtual plane of the camera 300 may be set at a position of the character 401 so that the character 401 has little to no parallax (and is thus displayed as appearing on the display).

One example method for addressing such an issue is provided by the technology described herein. In the example shown in FIG. 5A, a reference line 350 is set from the camera 300 position to the player character 401. More specifically, the system establishes a line 350 from the camera 300 position to the player character 401 and determines if an intersection occurs with the level geometry. In one non-limiting example, level geometry may refer to a simpler representation of the virtual space 400. That is, the virtual space 400 may be drawn with great detail that includes terrain objects having individual blades of grass, or various player characters exhibiting different facial expressions as they inhabit the virtual space 400. These details are rendered using a multitude of polygons that form the image of the virtual space 400. The level geometry may refer to a simpler version of the virtual space 400 that represents various aspects of the terrain and/or virtual objects, but without the great detail of the actual image itself. It will be appreciated that the level geometry can be used for various image rendering and/or collision detection techniques. For example, the level geometry may be used to ensure that one or more virtual objects do not "fall through" the terrain or walk through a wall in the virtual space. The "less" detailed level geometry thus makes it easier to perform such collision detection as there are less pieces of geometry (or polygon data) that the system must perform the checks against.

FIG. 5B shows the example of FIG. 5A from a two-dimensional side-view perspective. In the example shown in FIGS. 5A and 5B, the line 350 intersects with terrain 410 at intersection points 411 and 412. In this example, the line 350 intersects (or "collides") with the portion of the terrain sticking upward near the position of the camera 300 thus causing a portion of the terrain at this location to not display as properly in a stereoscopic image.

The system can address the issue by adjusting the reference virtual plane of the camera 300 to the closest point of intersection (in this example, intersection point 411) rather than the player character 401. In one non-limiting example embodiment, the system may use the distance between the camera 300 and the intersection point 411 for adjusting the reference virtual plane of the camera 300. For example, the distance of the reference virtual plane from camera 300 may be initially set as the distance between the camera 300 and the player character 401. When the intersection between the camera 300 and the character 401 is detected at point 411, the system may then set the distance of the reference virtual plane of camera 300 as the distance between the camera 300 and the intersection point 411. This approach advantageously prevents the terrain from "popping out" as everything that is displayed after this adjustment will appear "inside" the screen.

FIG. 5C depicts the process flow for carrying out the methods depicted in FIGS. 5A and 5B. The process begins at 510 where the system can position one or more virtual cameras 300 in the virtual space that includes the various objects within the virtual space (e.g., terrain, player character(s), enemy character(s), obstacle(s), treasure(s)).

At 520, the system can obtain the location in the virtual three dimensional space of camera 300. This position can be represented as a three-dimensional coordinate along x-, y-, and z-axes. The system can also obtain the location of a target object (step 530) in the virtual three-dimensional space. In this example, the target object may be player character 401. Of course, this example is non-limiting and the target object may be any other object and/or point in the virtual space.

With the positions of the camera 300 and character 401, the system can establish a line 350 from the camera 300 to the character 401 (540). In one non-limiting example, the line 350 will be a reference line that is not displayed but only used for purposes of determining if an intersection exists along the line 350 (550).

If the system does not detect an intersection, the reference virtual plane of the camera 300 may be set to the target object (e.g., player character 401) (560). In one non-limiting example, the distance between the camera 300 and the character 401 may be used to set the distance of the reference virtual plane from the camera 300. In another example, a specific value may be used instead to set the distance of the reference virtual plane. For example, a near clipping plane of camera 300 may be used to set the position of the reference virtual plane.

If the system detects an intersection, the reference virtual plane of the camera 300 is set to the intersection/collision point that is closest to the camera 300 (570). In one non-limiting example, the distance between the camera 300 and the intersection point may be used to set the distance of the reference virtual plane from the camera 300. The system can then render the image (580) from a viewpoint of virtual camera 300.

It should be appreciated that the line 350 may not be actually drawn (i.e., displayed) on the screen, but is instead used as a reference for determining the intersection point. Moreover, in the example shown in FIGS. 5A-5C, the intersection occurs based on the line 350 intersection with one or more pieces of the level geometry. Based on this detection, the system can select the point of intersection that is closest to the camera (in the instances where more than one intersection occurs) and then set the reference virtual plane at the distance between the camera 300 and the closest point of collision. Of course, if there is no collision detected, the system may maintain the positon of the reference virtual plane at the position of the player character 401 (or another specific value).

FIGS. 6A-6D show another example method for adjusting the visual effect of an image. Similar to the examples shown in FIGS. 5A-5C, the methods depicted in FIGS. 6A-6D employ a "collision check" in order to adjust the reference virtual plane of virtual camera 300. FIGS. 6A-6D show a non-limiting example embodiment where a bounding box 420 is used to determine if the reference virtual plane requires adjustment.

In FIG. 6A, the camera 300 is again placed at one end of the virtual space 400 where the player character 401 is positioned on the terrain 410 at almost an opposite end of the virtual space 400. Similar to FIG. 5A, this example depicts one or more pieces of the terrain 410 that are in front of the player character 401 between the character 401 and camera 300. Thus, again, one or more pieces of the terrain 410 (or the virtual objects displayed in the virtual space 400) may appear to "pop" out or provide an image that is uncomfortable to view by a viewer.

Figure 6A:
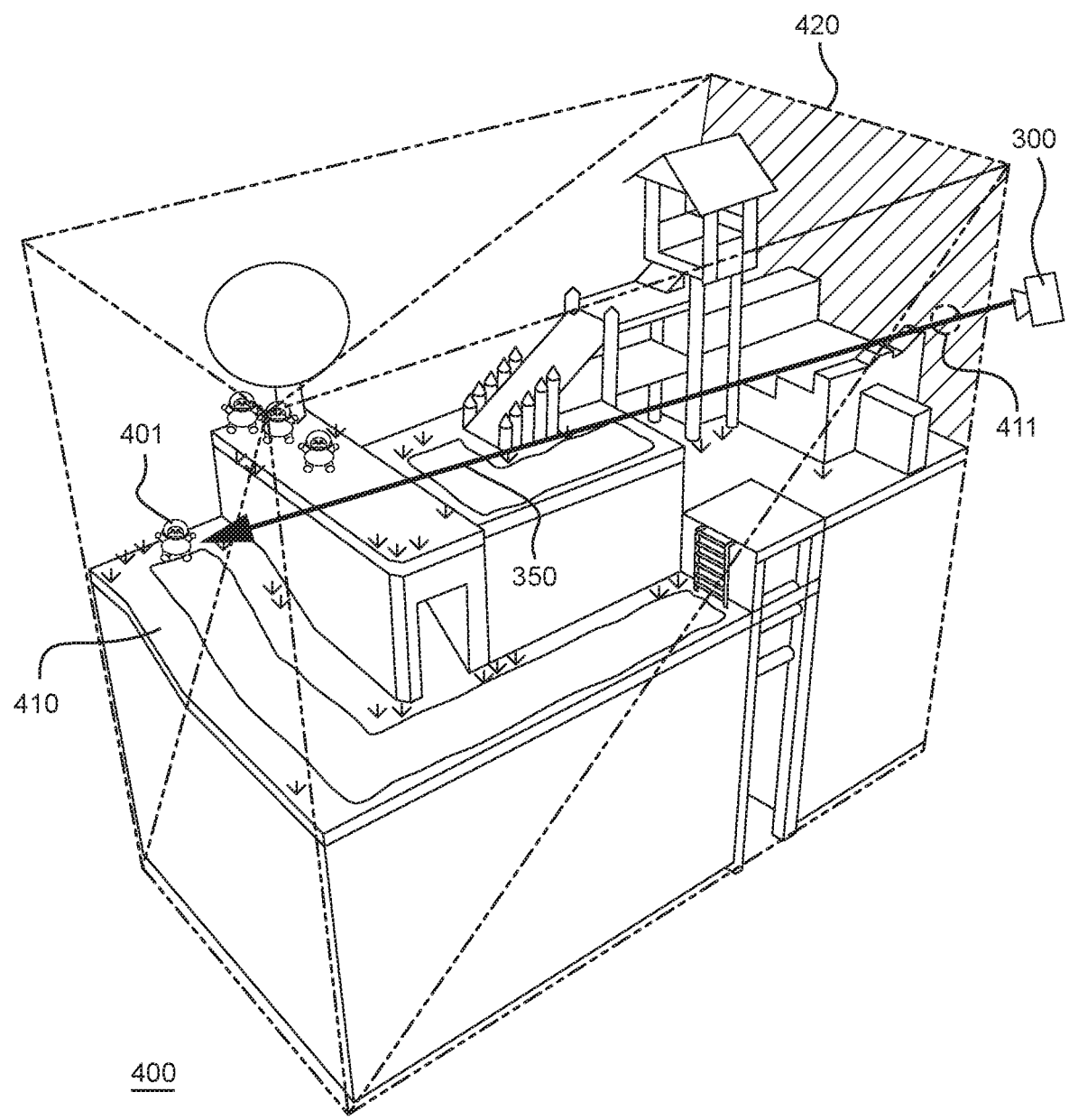
FIGS. 6A-6D show another example method for adjusting the visual effect of an image.

In the example shown in FIG. 6A, a bounding box 420 is provided to determine whether an intersection exists. In one example embodiment, the system can establish a bounding box 420 that encompasses the entirety of the virtual space 400. A reference line 350 can then be set from the position of camera 300 to a target (e.g., the player character 401). The system can then detect if an intersection occurs between the line 350 and one or more surfaces of the bounding box 420. In the example shown in FIG. 6A, at least one intersection/collision occurs at intersection point 411. In this specific example, the intersection point 411 occurs along the back surface of the box 420 closest to the camera 300 (i.e., shown with the diagonal lines on the surface).

In one example embodiment, more than one line 350 may be established from the position of camera 300 to the position of character 401. For example, the technology described herein is capable of establishing at least three lines which are used for left, center, and right sides of a viewing frustum. Such an implementation may advantageously prevent situations where the bounding box 420 intersects with part of the near clipping plane of the camera 300 that are off-center. The technology also makes it possible to calculate a nearest distance between any point on the bounding box 420 and the camera 300 near clipping plane. It should be appreciated that any number of lines may be established from a viewing position of camera 300 and a higher number of lines may provide a greater level of accuracy though at a higher processing cost to the system. Moreover, while the bounding box 420 is represented with respect to the virtual space 400, it should be appreciated that in an alternative approach, bounding box 420 may be transformed into a camera space (e.g., of camera 300) in which it may be more accurate to determine position of both the camera 300 and box 420.

Figure 6B:
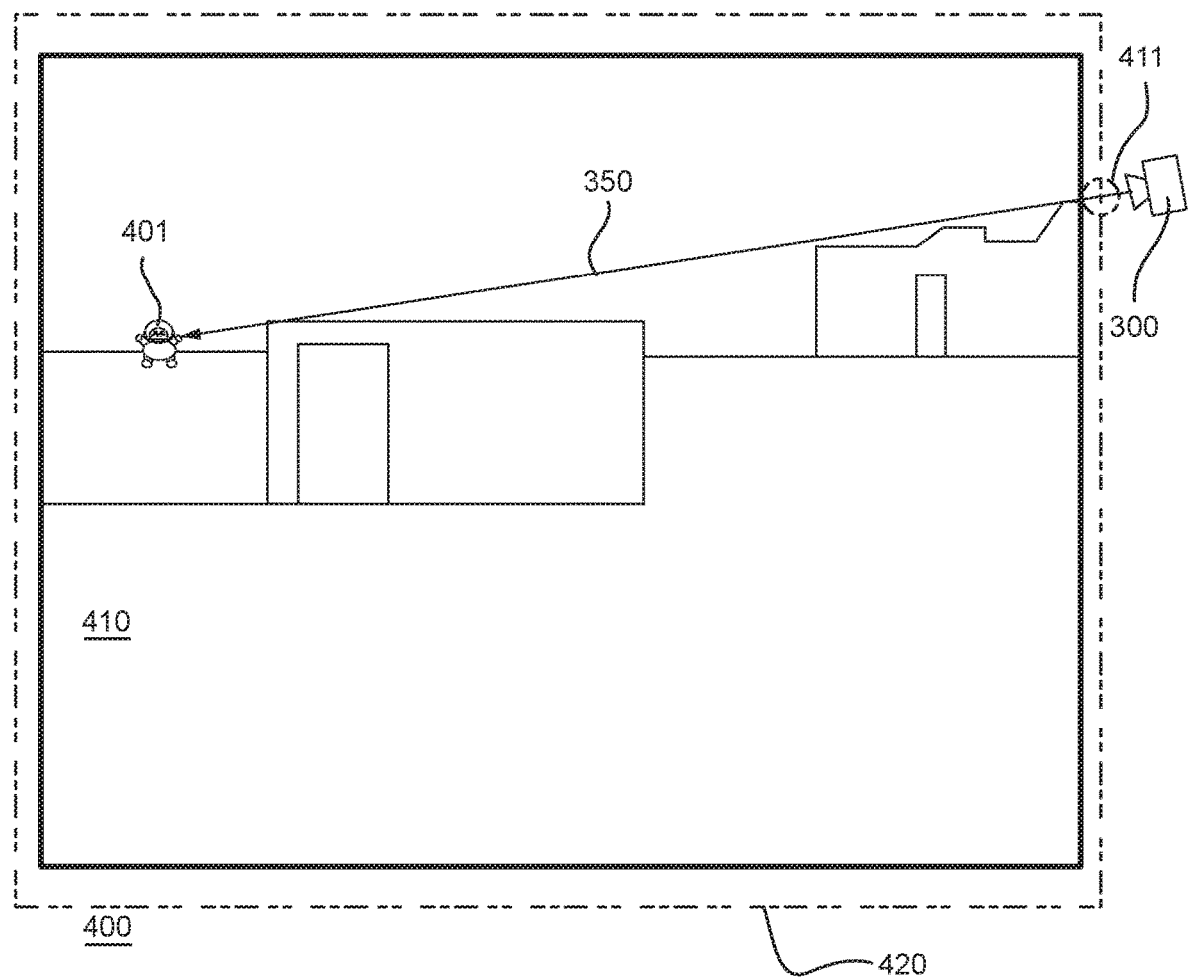
Figure 6C:
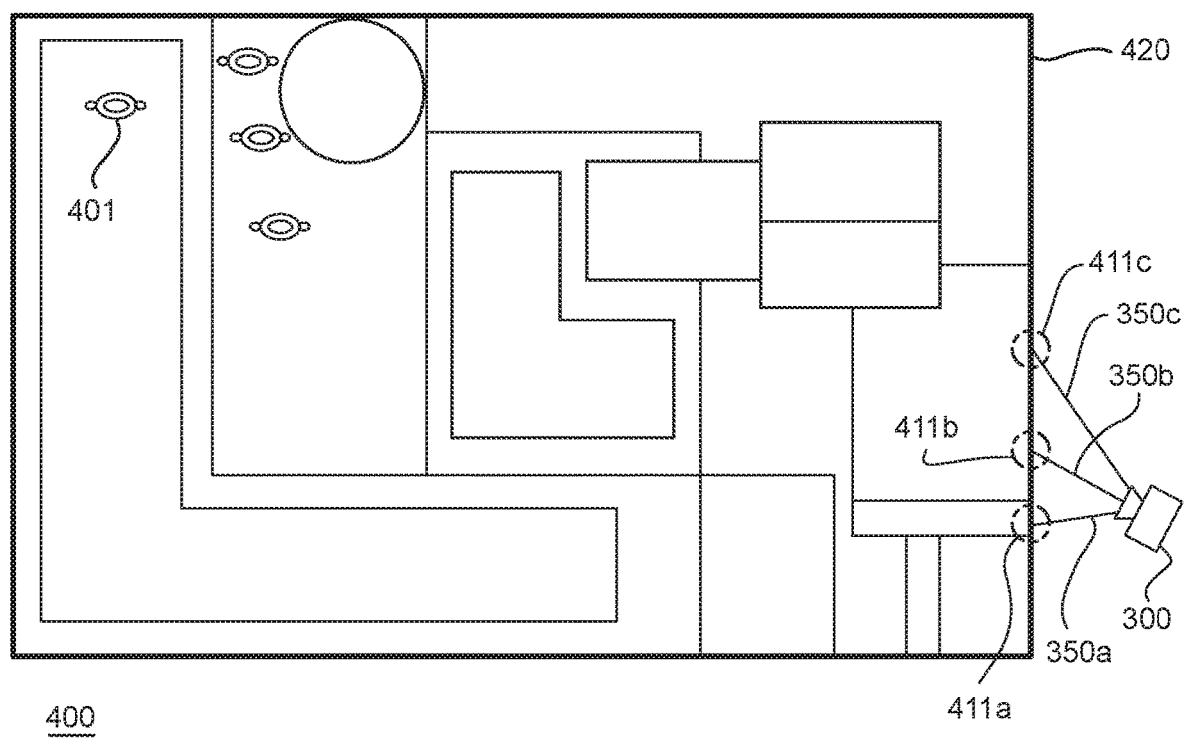

FIG. 6B shows an example embodiment of FIG. 6A from a side-view perspective while FIG. 6C shows an example embodiment of FIG. 6A from a top perspective (e.g., birds eye view). FIG. 6C also specifically illustrates an example embodiment where at least three reference lines 350a-c are drawn to detect various intersections with the bounding box 420.

The reference line 350 in FIG. 6B "collides" with bounding box 420 along the "rightmost" wall in the side view. In FIG. 6C, reference lines 350a-c are depicted to show the example where at least three lines 350a-c can be established from the position of camera 300. In the view of FIG. 6C, points of intersection occur at points 411a (intersecting with reference line 350a), 411b (intersecting with reference line 350b), and 411c (intersecting with reference line 350c).

In one example embodiment, the system may adjust the reference virtual plane of camera 300 based on a closest point of intersection 411 as shown in FIG. 6B (or point 411a shown in FIG. 6C). That is, the system may adjust the reference virtual plane from a position associated with the player character 401 to a position associated with the closest point of intersection 411 by using the distance between the camera 300 and the closest point of intersection 411 (or point 411a shown in FIG. 6C). The system may also add additional restrictions to improve the adjustment (e.g., by preventing any top or bottom intersection check if camera 300 is not allowed to rotate in that direction thus forcing the bounding box 420 to be "axis-aligned").

Figure 6D:
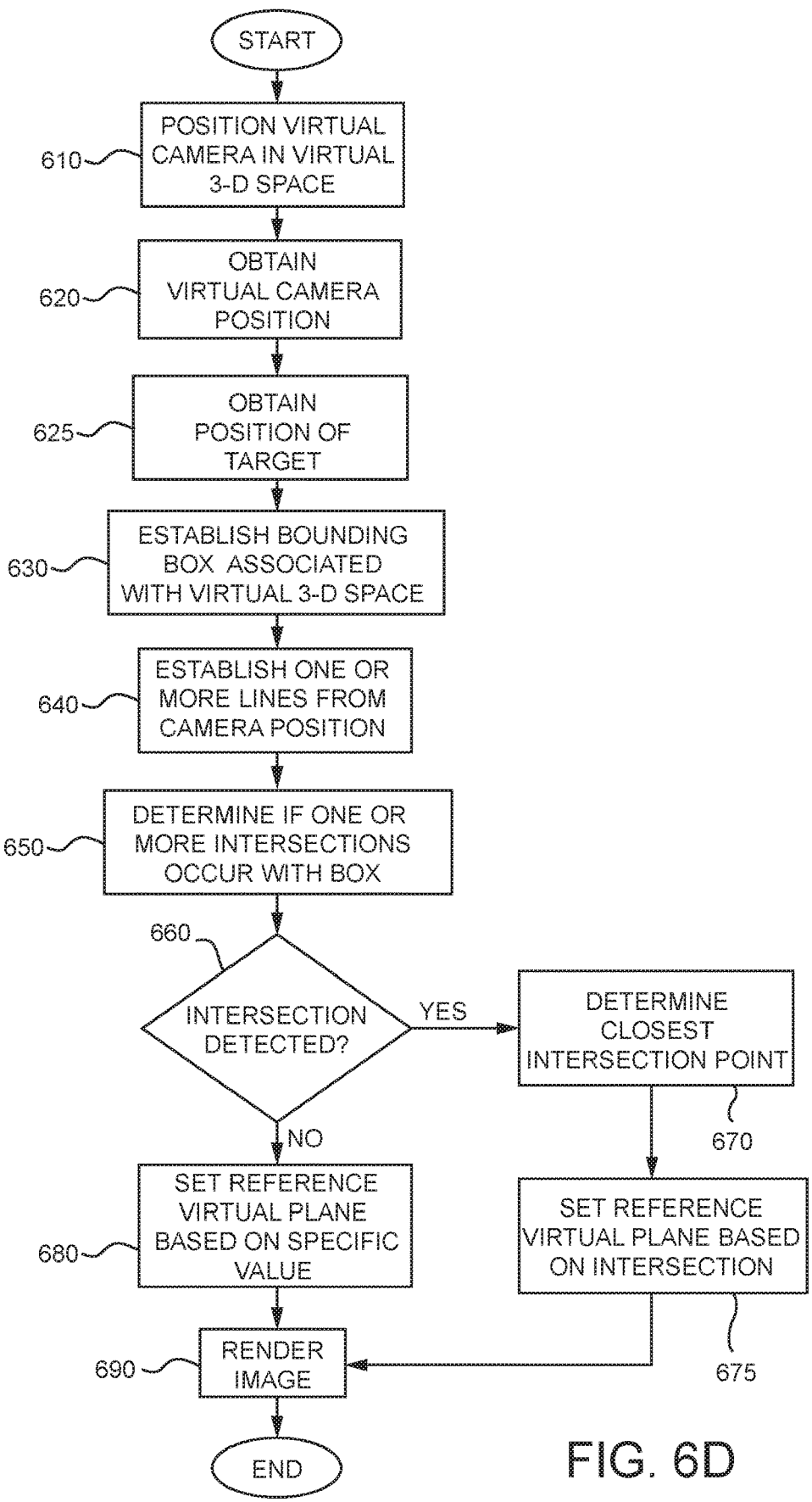

FIG. 6D depicts the process flow for carrying out the methods depicted in FIGS. 6A-C. The process begins at step 610 where the system can position one or more virtual cameras in the virtual space that includes the various objects within the virtual space (e.g., terrain, player character(s), enemy character(s), obstacle(s), treasure(s)). At step 620, the system can obtain the location in the virtual three dimensional space of camera 300. This position can be represented as a three-dimensional coordinate along x-, y-, and z-axes.

Likewise, at step 625, the system can obtain the location of a target (e.g., player character 401) in the virtual three-dimensional space (which can also be represented as a three-dimensional coordinate along x-, y-, and z-axes).

At step 630, the system can establish a bounding box 420 around the virtual space 400. In one non-limiting example, the bounding box 420 may encompass the entirety of the virtual space 400. This example is of course non-limiting and the technology envisions the bounding box 420 to only encompass a portion of the virtual space 400. It should be appreciated that the box 420 may not necessarily be represented in a substantially cube shape and can be of any shape including cylindrical, spherical, cone, or any other shape.

With the positions of the camera 300 and player character 401, the system can establish one or more lines 350 from the camera 300 (step 640) towards the virtual space 400 in the direction of a target (e.g., player character 401). In the example shown in FIG. 6B, the reference line 350 is established from position of camera 300 to player character 401 where intersections with the bounding box 420 wall(s) is detected. In the example shown in FIG. 6C, three reference lines 350*a-c* are established (e.g., in left, center, and right directions, respectively) from the position of camera 300 towards the virtual space 400 in a direction associated with a target (e.g., player character 401). In one example embodiment, the center reference line 350*b* may be established from the camera 300 toward player character 401 where the left reference line 350*a* and right reference line 350*c* may be established at substantially same angles with respect to center reference line 350*b*.

It should be appreciated that in one non-limiting example, the line 350 (or lines 350*a-c*) will be a reference line that is not displayed but only used for purposes of determining if an intersection has occurred along the line 350 (step 650). More specifically, the system will determine if one of the lines (shown as line 350 in FIG. 6B and lines 350*a-c* in FIG. 6C) intersects with a surface of the bounding box 420. Based on the point of intersection/collision, the system can adjust the reference virtual plane of camera 300.

In more detail, the system can determine if an intersection has occurred along line(s) 350 with one or more surfaces of box 420 (step 660). If there is no intersection, or if the distance between character 401 and camera 300 is closer than any point of intersection with box 420, the system can set the reference virtual plane of camera 300 based on a specific value (e.g., a minimum "very close" value) (step 680) and then render an image of the virtual space 400 (step 690). For example, the camera 300 may be positioned inside the virtual space 400 at a position inside the box 420 where the distance between the camera 300 and player character 401 is closer than any collision with the walls of box 420. In this case, the reference virtual plane of camera 300 may be set to based on a specific value (e.g., the camera 300 near clipping plane).

If one or more intersections occur with one or more surfaces of the box 420, the system can determine a position of the closest intersection point (step 670). In the example of FIG. 6B, the system detects a closest intersection at point 411 and thus the reference virtual plane of the virtual camera 300 is adjusted based on a distance between camera 300 and point 411 (step 675). For example, the system may set the reference virtual plane of camera 300 using the distance between camera 300 and point 411.

In the example shown in FIG. 6C, the system detects intersection points 411*a*, 411*b*, and 411*c* along reference lines 350*a*, 350*b*, and 350*c*, respectively. As collision point 411*a* is closest in position to camera 300, the system can set the reference virtual plane using the distance between camera 300 and point 411*a* (step 675). Once the reference virtual plane is set, the system can render the image of the virtual space 400 (step 690).

It should be appreciated that the line 350 (or lines 350*a-c*) may not be actually drawn (i.e., displayed) on the screen, but is instead used as a reference for determining the intersection point. Furthermore, box 420 may not be drawn (i.e., displayed) on the screen, but is instead also used as a reference for determining the intersection point. As a non-limiting example, the system will render the image shown in the example in FIG. 6A by generating multiple polygons that constitute the terrain, obstacles, player character(s), enemy character(s), and any other various virtual objects. Before the screen is refreshed (i.e., before the next image is drawn on the display), the system detects whether an intersection exists along each point of the line 350 (or lines 350*a-c*) with one or more surfaces of the bounding box 420. Based on this detection, the system can select the point of intersection that is closest to the camera (in the instances where more than one collision occurs) and then set the reference virtual plane of camera 300 based on the closest point of collision.

It should also be appreciated that using the bounding box 420 can provide certain advantages from other methods. In particular, on systems having lower processor power, intersection checks with geometry can add undue processing cost to the game processing. Moreover, the intersection detection may work better with shorter ray checks and thus an intersection check across the entire level/landscape will be more expensive than other intersection checks. Additionally, there arises situations where objects that locate away from the line(s) for intersection checking will "pop" out. In one non-limiting example, using the bounding box 420 provides advantages over these other approaches because the box 420 enables more efficient intersection/collision detection. For example, rather than having to perform an intersection check with each portion of level geometry, the system can advantageously use the bounding box 420 to determine if intersections occur along different surfaces of the box 420. That is, a "straight line" intersection must pass through all of the geometry where the bounding box 420 only needs to detect intersections with the different surfaces of the box 420. Such an implementation may be more than a hundred times faster to perform the checking compared to other approaches and thus the system advantageously conserves processing cost (which is particularly useful for systems that have lower processing resources).

Figure 7A:
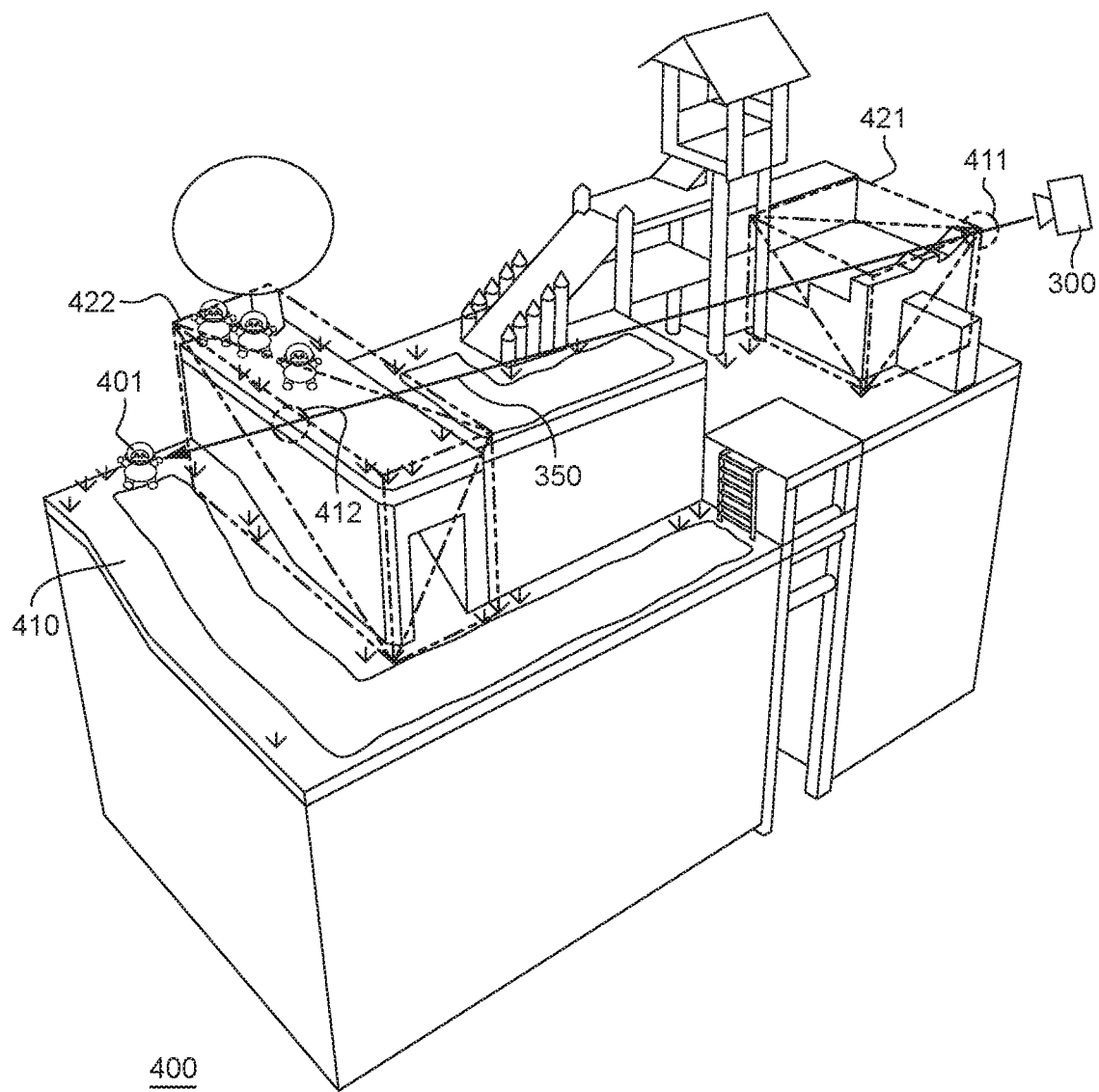
FIGS. 7A-7C show another example method for adjusting the visual effect of an image.
Figure 7B:
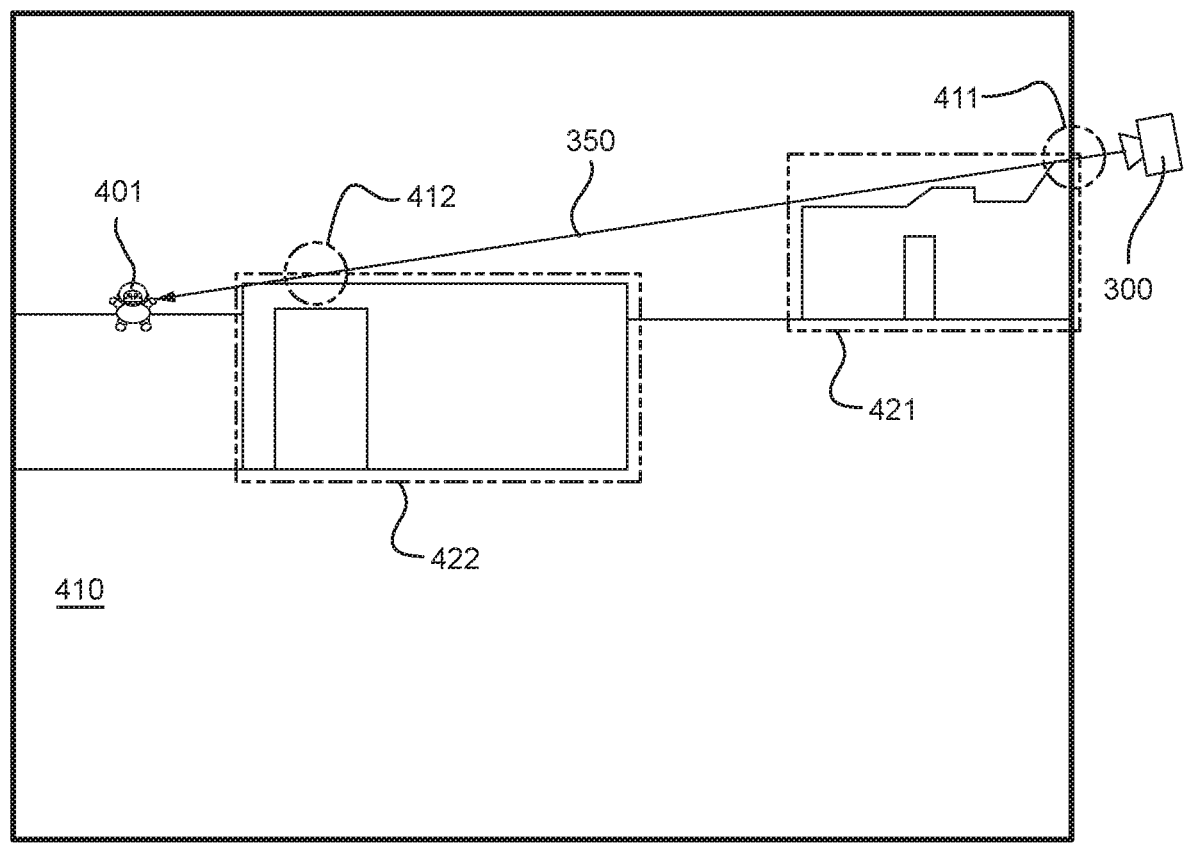
Figure 7C:
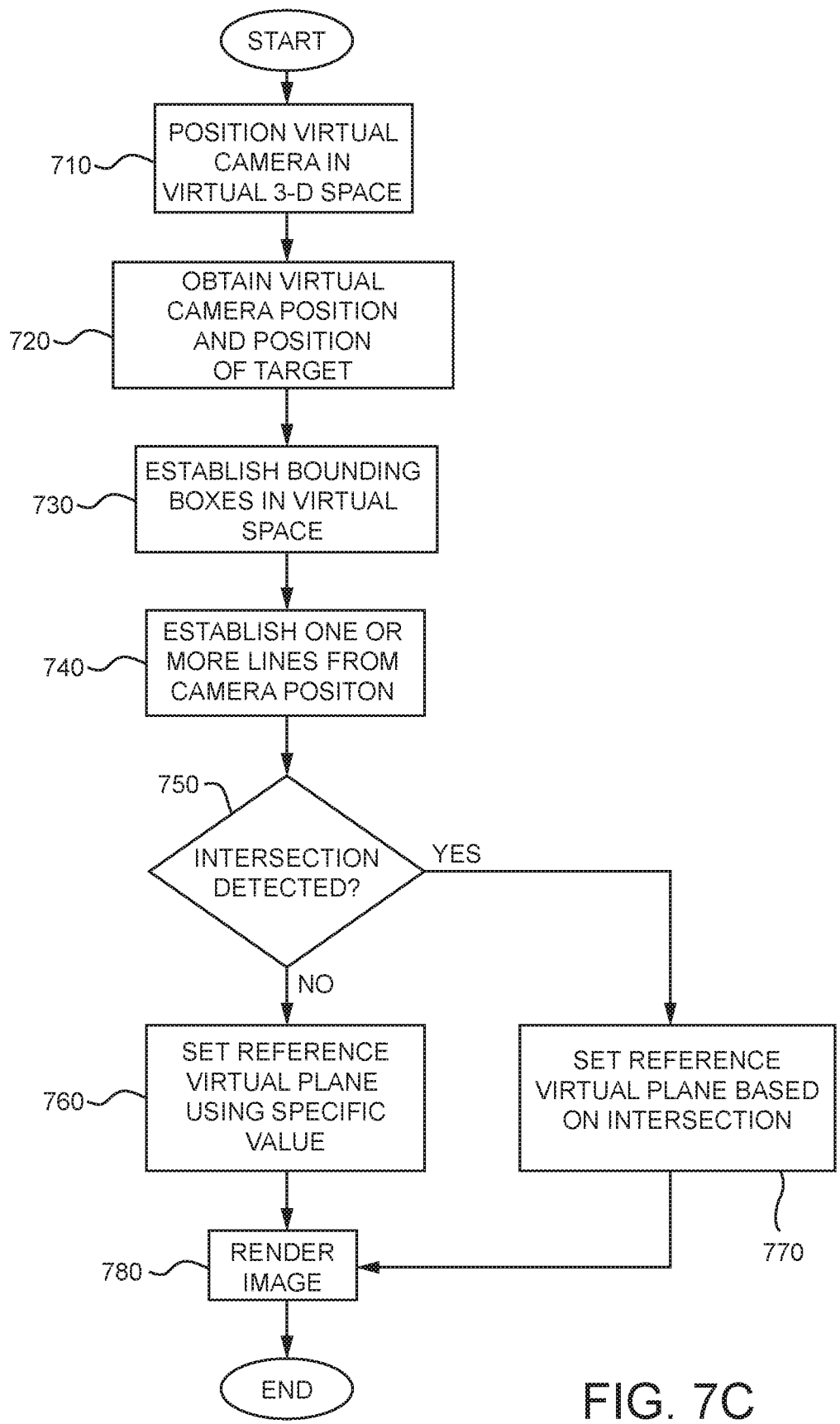

FIGS. 7A-C show another example method for adjusting the visual effect of an image. Similar to the examples shown in FIGS. 5A-C and 6A-D, the methods depicted in FIGS. 7A-C also employ an intersection check in order to adjust the reference virtual plane of virtual camera 300. In certain example embodiments, the player character 401 may be positioned in portions of the virtual space 400 that are more difficult to use a single bounding box method. For example, a player character 401 may be positioned in a "wooden tower" where the bounding box wall is too far from the actual wall of the player. Additionally, some levels may contain several small areas connected through different objects and obstacles (e.g., pipes, cannons, ramps).

FIGS. 7A-C show a non-limiting example embodiment where one or more bounding boxes 421 and 422 are used to determine if the reference virtual plane requires adjustment. The methods presented in FIGS. 7A-C may be used to address some of these aforementioned issues.

In FIG. 7A, the camera 300 is again placed at one end of the virtual space 400 where the player character 401 is positioned on the terrain 410 at almost an opposite end of the virtual space 400. This example again depicts one or more pieces of the terrain 410 and/or the virtual objects displayed in the virtual space 400 that are in front of the player character 401 between the character 401 and camera 300. One or more pieces of the terrain 410 may appear to "pop" out or provide an image that is uncomfortable to view by a viewer.

In the example shown in FIG. 7A, multiple bounding boxes (i.e., bounding box 421 and bounding box 422) are provided to determine whether an intersection exists. In one example embodiment, the system can establish multiple bounding boxes 421/422 over one or more pieces of terrain 410. A reference line 350 can be established from the position of camera 300 to the position of a target (e.g., player character 401). The system can then detect if an intersection exists between the reference line 350 and any surface of the one or more bounding boxes 421/422. It should be appreciated that more than one reference line 350 may be established from the position of the virtual camera 300. For example, the system may establish three references lines 350a-c similar to the example depicted in FIG. 6C.

In the example shown in FIG. 7A, an intersection occurs along at least two points on the two different bounding boxes 421/422, respectively. In one non-limiting example embodiment, the system may adjust the reference virtual plane of virtual camera 300 based on an intersection point associated with the respective box 421/422 that is closest to virtual camera 300.

It should be appreciated that, in some example embodiments, stereoscopic values at points of clipping when changing between two or more bounding boxes can drastically change. In order to prevent sudden changes in the stereoscopic values, the system may perform an interpolation across a number of frames to move from the previous stereoscopic value to the next stereoscopic value. Certain checks may also be performed with all bounding boxes in the level to ensure that no pieces of level geometry intersect with the stereoscopic focal point. It should be appreciated that such techniques, while discussed with respect to the multiple bounding box methods described in FIGS. 7A-7C, may be applied to any of the method described herein (e.g., the level geometry method discussed with respect to FIGS. 5A-C and/or the single bounding box method discussed with respect to FIGS. 6A-D).

When the camera 300 is completely within a particular bounding box, a minimum value (e.g., the near clipping plane of camera 300) may be used as to adjust the reference virtual plane. Additionally, to prevent jarring transitions in the stereoscopic focal point, the system can interpolate when the reference virtual plane becomes farther away. Moreover, the system may not perform interpolation when the reference virtual plane becomes closer in order to prevent objects from ever crossing the reference virtual plane. In doing so, the system may enable the camera 300 movement so that it causes the reference virtual plane to "slide" across edges of different bounding boxes smoothly and to prevent harsh transitions. Again, it should be appreciated that such techniques, while discussed with respect to the multiple bounding box methods described in FIGS. 7A-7C, may be applied to any of the method described herein (e.g., the level geometry method discussed with respect to FIGS. 5A-C and/or the single bounding box method discussed with respect to FIGS. 6A-D).

FIG. 7B depicts a side view of the virtual space 400 showing the scenario depicted in FIG. 7A. FIG. 7B specifically illustrates intersection points along reference line 350 with the bounding boxes 421/422. As can be seen in FIG. 7B, the player character 401 is positioned at the opposite end of the virtual space from camera 300 where one or more portions of terrain sit between the character 401 and camera 300.

In this example, the pieces of terrain are encompassed with multiple bounding boxes shown with boxes 421/422. Similar to the example shown in FIG. 5C, the reference line 350 may intersect with one or more bounding boxes 421/422 encompassing the respective portions of terrain. In this example, the line 350 intersects with boxes 421 and 422 at intersection points 411 and 412, respectively. The system may determine the closest intersection point and the use the distance between the camera 300 and the closest intersection point for adjusting the reference virtual plane of camera 300. In the example shown in FIG. 7B, the closest intersection point is represented by point 411 and the distance between camera 300 and point 411 may be used to adjust the reference virtual plane of the camera 300.

FIG. 7C depicts the process flow for carrying out the method depicted in FIGS. 7A & 7B. The process begins at step 710 where the system can generate a virtual space that includes the various objects within the virtual space (e.g., terrain, player character(s), enemy character(s), obstacle(s), treasure(s)). At step 720, the system can obtain the location in the virtual three dimensional space of camera 300 and a target (e.g., player character 401). This position can be represented as a three-dimensional coordinate along x-, y-, and z-axes.

At step 730, the system can establish multiple bounding boxes (e.g., boxes 421 and 422) around various portions of terrain 410 in the virtual space 400. In one non-limiting example, the terrain 410 may be entirely covered with multiple bounding boxes. That is, the multiple bounding boxes may be established so that each area of the terrain 410 is covered by at least one bounding box. Moreover, the multiple bounding boxes can overlap each other in the virtual space 400. Of course, this example is non-limiting and the technology described herein envisions only portions of the terrain 410 being encompassed by bounding boxes.

The system may then establish one or more reference lines 350 from the position of virtual camera 300 towards a position of a target (e.g., player character 401) (step 740). In one non-limiting example, the line(s) 350 will be a reference line that is not displayed but only used for purposes of determining if an intersection exists along the line(s) 350 (step 750). More specifically, the system will determine if line(s) 350 intersects with one or more surfaces of the one or more bounding boxes. If an intersection exists, the system can determine which intersection point is closest to camera 300 and then adjust the reference virtual plane based on the closest intersection point.

In more detail, the system can determine if an intersection has occurred along line(s) 350 with one or more surfaces of boxes 421/422. If there is only a single collision, the system can set the reference virtual plane of camera 300 based on a position associated with the detected intersection point (step 770) and then render an image of the virtual space 400 (step 780). If more than one intersection point is detected, the system can determine a position of the closest intersection point and then set the reference virtual plane of the virtual camera 300 using a distance between the camera 300 and the closest intersection point. Once the reference virtual plane is set, the system can render the image of the virtual space 400 (step 780).

If the system does not detect any intersection between line(s) 350 and any of the bounding boxes, the system can set the reference virtual plane of the virtual camera 300 based on a specific value (e.g., a minimum "very close" value) (step 760). In one non-limiting example, the system may use the distance of camera 300 near clipping plane in setting the reference virtual plane of camera 300 and then render the image of the virtual space (step 780).

It should be appreciated that the line(s) 350 may not be actually drawn (i.e., displayed) on the screen, but is instead used as a reference for determining the collision point. Furthermore, boxes 421/422 may not be drawn (i.e., displayed) on the screen, but instead also used as a reference for determining the collision point.

As a non-limiting example, the system will render the image shown in the example in FIG. 7A by generating multiple polygons that constitute the terrain, obstacles, player character(s), enemy character(s), and any other various virtual objects. Before the screen is refreshed (i.e., before the next image is drawn on the display), the system detects whether an intersection has occurred along each point of the line(s) 350 with one or more surfaces of the bounding boxes 421/422. Based on this detection, the system can select the point of intersection that is closest to the camera (in the instances where more than one collision occurs) and then set the reference virtual plane using the distance between the camera 350 and the closest point of intersection.

It should be further appreciated that the examples mentioned throughout this document reference a virtual camera 300. It is to be understood that the virtual camera 300 may represent a single virtual camera and/or multiple virtual cameras. Moreover, the virtual camera 300 may be representative of reference virtual camera 300 (discussed with respect to FIG. 3B, above) where the reference virtual camera 300 is based on, at least, left and right virtual cameras 304 and 302, respectively. Of course, the reference virtual camera 300 is not limited to only left and right virtual cameras 304/302 and the technology described herein envisions the reference virtual camera 300 using any number and type of virtual cameras.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Technical Advantages

The technology described herein provides improvements to existing display technology, particularly where the display technology involves stereoscopically displayed images. In one non-limiting example, the technology allows for adjustment of the displayed image by detecting an intersection with respect to level geometry representing the displayed virtual space and/or with respect to one or more bounding boxes encompassing portions or the entirety of the virtual space. The techniques provide the advantage of adjusting a displayed image so that the objects that are displayed do not appear unnatural (or uncomfortable to view) thus resulting in an improved user interface. Moreover, and as explained above, the techniques associated with the bounding box(es) may provide faster and more efficient detection as opposed to other techniques because the system does not need to perform the detection against every element of level geometry (but only with respect to the surfaces of one or more bounding boxes). Such an approach may enable detection at a rate more than one hundred times faster than other approaches.

Selected Definitions

Whenever it is described in this document that a given item is present in "some embodiments," "various embodiments," "certain embodiments," "certain example embodiments," "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Further Applications of Described Subject Matter

Although process steps, algorithms or the like, including without limitation with reference to FIGS. 1-7C, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system configured to adjust a stereoscopic image, comprising:
   a processor; and
   a memory operatively coupled to the processor and storing computer readable instructions that, when executed by the processor, cause the system to:
      position at least one virtual camera in a virtual three-dimensional space;
      set a reference virtual plane of the virtual camera based on a position of a virtual player character object;
      based on a line between a viewing position of the virtual camera and the virtual player character object, determine if an intersection exists at a position along the line where the line intersects with an object in the virtual three-dimensional space;
      adjust the reference virtual plane of the virtual camera based on the position along the line where the intersection exists, wherein a distance between the adjusted reference virtual plane and the position of the virtual camera in the virtual three dimensional space corresponds to a distance between the position along the line where the intersection exists and the position of the virtual camera in the virtual three-dimensional space; and
      generate for display a stereoscopic image showing the virtual three-dimensional space from a perspective of the viewing position of the virtual camera.

2. The system of claim 1, wherein the intersection exists when the position along the line intersects with level geometry of game terrain in the virtual three-dimensional space.

3. The system of claim 1, wherein
   the virtual three-dimensional space further includes a game world having at least game terrain and the virtual player character object, and a bounding box set around the game world; and
   the intersection exists when the position along the line intersects with at least one portion of the bounding box.

4. The system of claim 1, wherein
   the virtual three-dimensional space further includes a game world having at least game terrain and the virtual player character object, and multiple bounding boxes being set to cover the game world, and
   the intersection exists when the position along the line intersects with at least a portion of one of the multiple bounding boxes.

5. The system of claim 1, wherein the reference virtual plane is set perpendicular to a viewing direction of the virtual camera, and positioned within a view volume of the virtual camera.

6. A system configured to adjust a parameter associated with at least one virtual camera, comprising:
   a processor; and
   a memory operatively coupled to the processor and storing computer readable instructions that, when executed by the processor, cause the system to:
      based on a first line between a viewing position of a first virtual camera in a virtual three-dimensional space and a target in the virtual three-dimensional space, determine if an intersection exists between the viewing position and a position along the line;
      adjust a reference virtual plane of the first virtual camera based on the position along the first line where the intersection exists, wherein a distance between the adjusted reference virtual plane and the position of the first virtual camera in the virtual three dimensional space corresponds to a distance between the position along the first line where the intersection exists and the position of the first virtual camera in the virtual three-dimensional space; and
      generate for display an image representing the virtual three-dimensional space from a perspective of the first virtual camera.

7. The system of claim 6, wherein the intersection exists when the position along the first line intersects with level geometry of game terrain in the virtual three-dimensional space.

8. The system of claim 6, wherein
   the virtual three-dimensional space further includes a game world having at least game terrain and a virtual player character object, and a bounding box set around the game world; and
   the intersection exists when the position along the first line intersects with at least one portion of the bounding box.

9. The system of claim 6, wherein the computer readable instructions, when executed, further cause the system to:
   determine, based on multiple lines between the viewing position of the first virtual camera and a virtual player character object, if one or more intersections exists between the viewing position and positions along the multiple lines, the multiple lines including at least the first line and a second line; and
   adjust the reference virtual plane of the first virtual camera based on a position along one of the multiple lines closest to the first virtual camera.

10. The system of claim 6, wherein
    the virtual three-dimensional space further includes a game world having at least game terrain and a virtual player character object, and multiple bounding boxes being set to cover the game world, and
    the intersection exists when the position along the first line intersects with at least a portion of one of the multiple bounding boxes.

11. The system of claim 6, wherein the viewing position is determined based on a positon of at least the first camera and a second vertual camera, and the image generated for display is a stereoscopic image viewed from the viewing position determined based on the position of at least the first and second virtual cameras.

12. A method of adjusting a processing device, the method comprising:
    positioning at least one virtual camera in a virtual three-dimensional space;
    based on a line between a viewing position of the virtual camera in the virtual three-dimensional space and a target in the virtual three-dimensional space, determining if an intersection exists between the viewing position and a position along the line;

adjusting a reference virtual plane of the virtual camera based on the position along the line where the intersection exists, wherein a distance between the adjusted reference virtual plane and the position of the virtual camera in the virtual three dimensional space corresponds to a distance between the position along the line where the intersection exists and the position of the virtual camera is the virtual three-dimensional space; and generating for display an image representing the virtual three-dimensional space from a perspective of the virtual camera.

13. The method of claim 12, wherein the intersection exists when the position along the line intersects with level geometry of game terrain in the virtual three-dimensional space.

14. The method of claim 12, wherein
the virtual three-dimensional space further includes a game world having at least game terrain and a virtual player character object, and a bounding box set around the game world; and
the intersection exists when the position along the line intersects with at least one portion of the bounding box.

15. A non-transitory computer-readable storage medium comprising computer readable instructions that, when executed by a processor of an information processing device, cause the processor to provide execution comprising:

position at least one virtual camera in a virtual three-dimensional space;

based on a line between a viewing position of the virtual camera in the virtual three-dimensional space and a virtual object in the virtual three-dimensional space, determine if an intersection exists between the viewing position and a position along the line;

adjusting a reference virtual plane of the virtual camera based on the position along the line where the intersection exists, wherein a distance between the adjusted reference virtual plane and the position of the virtual camera in the virtual three dimensional space corresponds to a distance between the position along the line where the intersection exists and the position of the virtual camera in the virtual three-dimensional space; and generate for display a stereoscopic image representing the virtual three-dimensional space from a perspective of the virtual camera.

16. The non-transitory computer-readable storage medium of claim 15, wherein the intersection exists when the position along the line intersects with level geometry of game terrain in the virtual three-dimensional space.

17. The non-transitory computer-readable storage medium of claim 15, wherein
the virtual three-dimensional space further includes a game world having at least game terrain and the virtual object, and a bounding box set around the game world; and
the intersection exists when the position along the line intersects with at least one portion of the bounding box.

18. The non-transitory computer-readable storage medium of claim 15, wherein
the virtual three-dimensional space further includes a game world having at least game terrain and the virtual object, and multiple bounding boxes being set to cover the game world, and
the intersection exists when the position along the line intersects with at least a portion of one of the multiple bounding boxes.

* * * * *